US008499702B2

(12) United States Patent
Palmas et al.

(10) Patent No.: US 8,499,702 B2
(45) Date of Patent: Aug. 6, 2013

(54) CHAR-HANDLING PROCESSES IN A PYROLYSIS SYSTEM

(75) Inventors: Paolo Palmas, Des Plaines, IL (US); Paul Alvin Sechrist, South Barrington, IL (US); Daniel N. Myers, Arlington Heights, IL (US); Sid Kulprathipanja, Schaumburg, IL (US); Stanley Joseph Frey, Palatine, IL (US); Barry Freel, Greely (CA)

(73) Assignee: Ensyn Renewables, Inc., Wilmington, DE (US)

( * ) Notice: Subject to any disclaimer, the term of this patent is extended or adjusted under 35 U.S.C. 154(b) by 471 days.

(21) Appl. No.: 12/837,376

(22) Filed: Jul. 15, 2010

(65) Prior Publication Data

US 2012/0012039 A1 Jan. 19, 2012

(51) Int. Cl.
 *F23B 90/00* (2011.01)
(52) U.S. Cl.
 USPC ........... 110/341; 110/243; 110/244; 110/245; 48/197 R
(58) Field of Classification Search
 USPC .......................................... 110/341, 243–245
 See application file for complete search history.

(56) References Cited

U.S. PATENT DOCUMENTS

| | | | | | |
|---|---|---|---|---|---|
| 3,853,498 | A | * | 12/1974 | Bailie | 48/209 |
| 3,890,111 | A | * | 6/1975 | Knudsen | 48/197 R |
| 3,927,996 | A | * | 12/1975 | Knudsen et al. | 48/197 R |
| 4,103,902 | A | * | 8/1978 | Steiner et al. | 277/317 |
| 4,138,020 | A | * | 2/1979 | Steiner et al. | 414/288 |
| 4,219,537 | A | * | 8/1980 | Steiner | 423/569 |
| 4,272,402 | A | * | 6/1981 | Mayes | 502/40 |
| 4,325,327 | A | * | 4/1982 | Kantesaria et al. | 122/4 D |
| 4,364,796 | A | * | 12/1982 | Ishii et al. | 201/4 |
| 4,443,229 | A | * | 4/1984 | Sageman et al. | 48/197 R |
| 4,552,203 | A | * | 11/1985 | Chrysostome et al. | 165/300 |
| 4,710,357 | A | * | 12/1987 | Cetinkaya et al. | 422/144 |
| 4,823,712 | A | * | 4/1989 | Wormer | 110/245 |
| 4,849,091 | A | * | 7/1989 | Cabrera et al. | 208/113 |
| 4,988,430 | A | * | 1/1991 | Sechrist et al. | 208/113 |
| 5,011,592 | A | * | 4/1991 | Owen et al. | 208/113 |
| 5,077,252 | A | * | 12/1991 | Owen et al. | 502/43 |
| 5,713,977 | A | * | 2/1998 | Kobayashi | 65/134.6 |
| 5,961,786 | A | * | 10/1999 | Freel et al. | 202/121 |
| 6,814,940 | B1 | * | 11/2004 | Hiltunen et al. | 422/141 |
| 7,026,262 | B1 | * | 4/2006 | Palmas et al. | 502/41 |
| 7,247,233 | B1 | * | 7/2007 | Hedrick et al. | 208/113 |
| 7,572,362 | B2 | * | 8/2009 | Freel et al. | 208/126 |
| 2006/0180060 | A1 | * | 8/2006 | Crafton et al. | 110/341 |

(Continued)

FOREIGN PATENT DOCUMENTS

EP 1420058 A1 5/2004

*Primary Examiner* — Kenneth Rinehart
*Assistant Examiner* — Bao D Nguyen
(74) *Attorney, Agent, or Firm* — Jones Day

(57) ABSTRACT

Char-handling processes for controlling overall heat balance, ash accumulation, and afterburn in a reheater are provided. Carbonaceous biomass feedstock is pyrolyzed using a heat transfer medium forming pyrolysis products and a spent heat transfer medium. The spent heat transfer medium is separated into segregated char and char-depleted spent heat transfer medium. The char-depleted spent heat transfer medium is introduced into a dense bed of heat transfer medium fluidized by a stream of oxygen-containing regeneration gas. All or a portion of the segregated char is combusted in the dense bed using the stream of oxygen-containing regeneration gas. A portion of the segregated char may be exported out of the pyrolysis system to control the overall heat balance and ash accumulation.

21 Claims, 11 Drawing Sheets

U.S. PATENT DOCUMENTS

| | | | |
|---|---|---|---|
| 2007/0205139 A1* | 9/2007 | Kulprathipanja et al. | 208/113 |
| 2008/0035526 A1* | 2/2008 | Hedrick et al. | 208/113 |
| 2008/0081006 A1* | 4/2008 | Myers et al. | 422/145 |
| 2009/0090058 A1* | 4/2009 | Dam-Johansen et al. | 48/62 R |
| 2010/0163395 A1* | 7/2010 | Henrich et al. | 201/2.5 |

* cited by examiner

CHAR-HANDLING PROCESSES IN A PYROLYSIS SYSTEM

FIELD OF THE INVENTION

The present invention generally relates to char-handling processes in a pyrolysis system, and more particularly relates to char-handling processes for controlling the overall heat balance, ash accumulation, and afterburn in a reheater of a pyrolysis system.

DESCRIPTION OF RELATED ART

Pyrolysis is a thermal process during which solid carbonaceous biomass feedstock, i.e., "biomass", such as wood, agricultural wastes/residues, algae, forestry byproducts, cellulose and lignin, municipal waste, construction/demolition debris, or the like, is rapidly heated to pyrolysis temperatures of about 300° C. to about 900° C. in the absence of air using a pyrolysis reactor. Biomass may be pyrolyzed using various pyrolysis methods, including the Rapid Thermal Process method and catalytic pyrolysis. Under these conditions, solid and gaseous pyrolysis products are formed. The gaseous pyrolysis products ("pyrolysis gases") comprise a non-condensable portion and a condensable portion (vapors) that can be condensed into liquid biomass-derived pyrolysis oil. The solid pyrolysis products include combustible solids containing carbon, referred to as "char".

As known in the art, heat for the endothermic pyrolysis reaction is produced in a reheater zone of a pyrolysis reactor or in a separate reheater (collectively referred to herein as a "reheater") by combusting the non-condensable pyrolysis gases and the combustible solids produced in the pyrolysis reaction. Heat is transferred from the reheater to the pyrolysis reactor by a "heat transfer medium." While the heat for the endothermic pyrolysis reaction and ambient heat losses (collectively "heat demand") are normally balanced with the heat supplied from combustion in the reheater, heat balance is not always achieved. Pyrolysis of certain types of biomass generates considerably more combustible solids and thus more thermal energy than is required to meet the heat demand of the pyrolysis reactor. If too much heat is generated, large quantities of excess dilution air or the addition of expensive cooling systems may be required for the pyrolysis system.

The heat transfer medium typically comprises inert solids such as sand. In catalytic pyrolysis, catalytic solids may be used, instead of or in addition to the inert solids, as the heat transfer medium. During pyrolysis, the combustible solids mix with the inert solids, the catalytic solids if present, or both, forming spent heat transfer medium. Spent heat transfer medium has a reduced ability to transfer heat, and in the case of catalytic solids, also has a reduced catalytic activity. To restore the heat transfer medium, the spent heat transfer medium is continuously transferred from the pyrolysis reactor to the reheater after separation from the pyrolysis gases. The spent heat transfer medium is regenerated in the reheater by combusting the combustible solids in the mixture. The regenerated heat transfer medium is then recirculated to the pyrolysis reactor.

When the combustible solids are combusted in the reheater, the metals therein, typically the alkaline metals, are released as ash to mix with the regenerated heat transfer medium. As ash is continuously produced in the pyrolysis system, ash removal is necessary to balance the pyrolysis system. When the regenerated heat transfer medium is recirculated to the pyrolysis reactor with ash present, pyrolysis of the biomass may be disadvantageously affected by increased gas production.

The heat transfer medium is maintained as a fluidized dense bed in a lower portion of the reheater by the upward passage of an oxygen-containing regeneration gas stream through the fluidized dense bed. Reheater flue gas is in a dilute phase in an upper portion of the reheater. During regeneration of the spent heat transfer medium in the reheater, a portion of the combustible solids become entrained in the reheater flue gas. The short height of the dense bed in the reheater and the small size and low density of the combustible solids results in a considerable amount of the combustible solids escaping from the dense bed and burning in the dilute phase (so-called "afterburning"). The combustible solids may also be "blown" from the dense bed into the dilute phase because of the velocity (typically about 0.76 meters to about 0.91 meters/second (2.5-3 feet/second)) of the oxygen-containing regeneration gas up through the dense bed into the reheater flue gas in the dilute phase. Afterburning may also occur in the plenum and flue gas transfer lines through which the flue gas exits the reheater, rather than in the dense bed of the reheater.

In addition to afterburning of the combustible solids, afterburning of the carbon monoxide in the oxygen-containing regeneration gas to $CO_2$ in the dilute phase may occur. Reheaters typically are designed to operate so that substantially all of the carbon monoxide (CO) in the oxygen-containing regeneration gas combusts to form carbon dioxide ($CO_2$), thereby imparting the heat of reaction to the reheater. However, there may be incomplete combustion of the dilute phase flue gas CO to $CO_2$ or incomplete consumption of $O_2$ in the dilute phase. Either problem also gives rise to afterburning. Afterburning is exothermic, and either must be quenched by additional injection of the oxygen-containing regeneration gas or the flue gas must absorb the heat of combustion, which undesirably decreases the amount of heat transferred to the dense bed.

Accordingly, it is desirable to provide processes for controlling the overall heat balance, ash accumulation, and afterburn in a reheater of a pyrolysis system. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Processes are provided for pyrolysis of a carbonaceous biomass feedstock in a pyrolysis system. In accordance with one exemplary embodiment, the process comprises pyrolyzing carbonaceous biomass feedstock using a heat transfer medium forming pyrolysis products and a spent heat transfer medium. The spent heat transfer medium is separated into segregated char and char-depleted spent heat transfer medium. The char-depleted spent heat transfer medium is introduced into a dense bed of heat transfer medium fluidized by a stream of oxygen-containing regeneration gas.

Processes are provided for controlling heat balance, afterburn, and ash accumulation in a reheater in accordance with yet another exemplary embodiment of the present invention. The process comprises separating spent heat transfer medium from a pyrolysis reactor into char-depleted spent heat transfer medium and segregated char. The char-depleted spent heat transfer medium is introduced into a fluidized dense bed of heat transfer medium. The fluidized dense bed is maintained by a stream of oxygen-containing regeneration gas and a dilute phase above the fluidized dense bed. At least a portion of the segregated char is introduced into the fluidized dense bed of the reheater below the elevation where the char-depleted spent heat transfer medium is introduced, into the stream of oxygen-containing regeneration gas outside of the reheater, or both, to combust the segregated char below the dilute phase.

Processes are provided for controlling heat balance, afterburn, and ash accumulation in a reheater in accordance with yet another exemplary embodiment of the present invention. The reheater includes a fluidized dense bed of heat transfer medium and a dilute phase. The dilute phase is positioned above the fluidized dense bed. The process comprises substantially separating char from a spent heat transfer medium to form segregated char and char-depleted spent heat transfer medium. The char-depleted spent heat transfer medium comprises a mixture of residual char and inert solids, catalytic solids, or both. The char-depleted spent heat transfer medium is introduced into the reheater combusting the residual char to convert the char-depleted spent heat transfer medium into a heat transfer medium using an oxygen-containing regeneration gas. The oxygen-containing regeneration gas is introduced into the reheater through an inlet riser. The segregated char is combusted with an effective amount of the heat transfer medium from the fluidized dense bed in the oxygen-containing regeneration gas outside the reheater.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to processes for handling combustible solids (hereinafter "combustible solids" or "char" produced during pyrolysis of carbonaceous biomass feedstock). Char is segregated from a heat transfer medium to control afterburn in a reheater during regeneration of the heat transfer medium. A portion of the segregated char may be exported to control the overall heat balance and accumulation of ash in the pyrolysis system.

Figure 1:
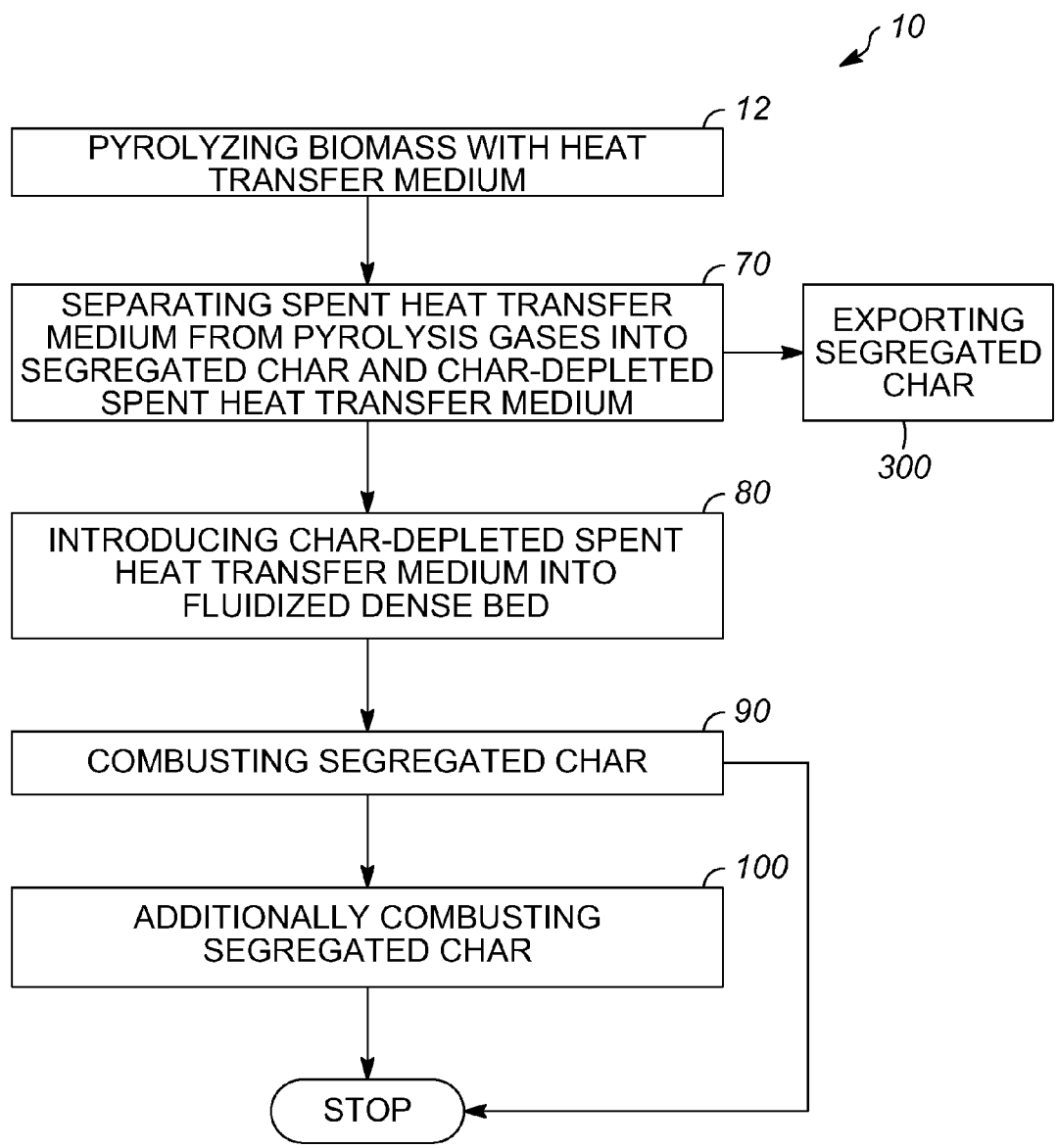
FIG. 1 is a flow chart of a char-handling process, according to exemplary embodiments of the present invention.
Figure 2:
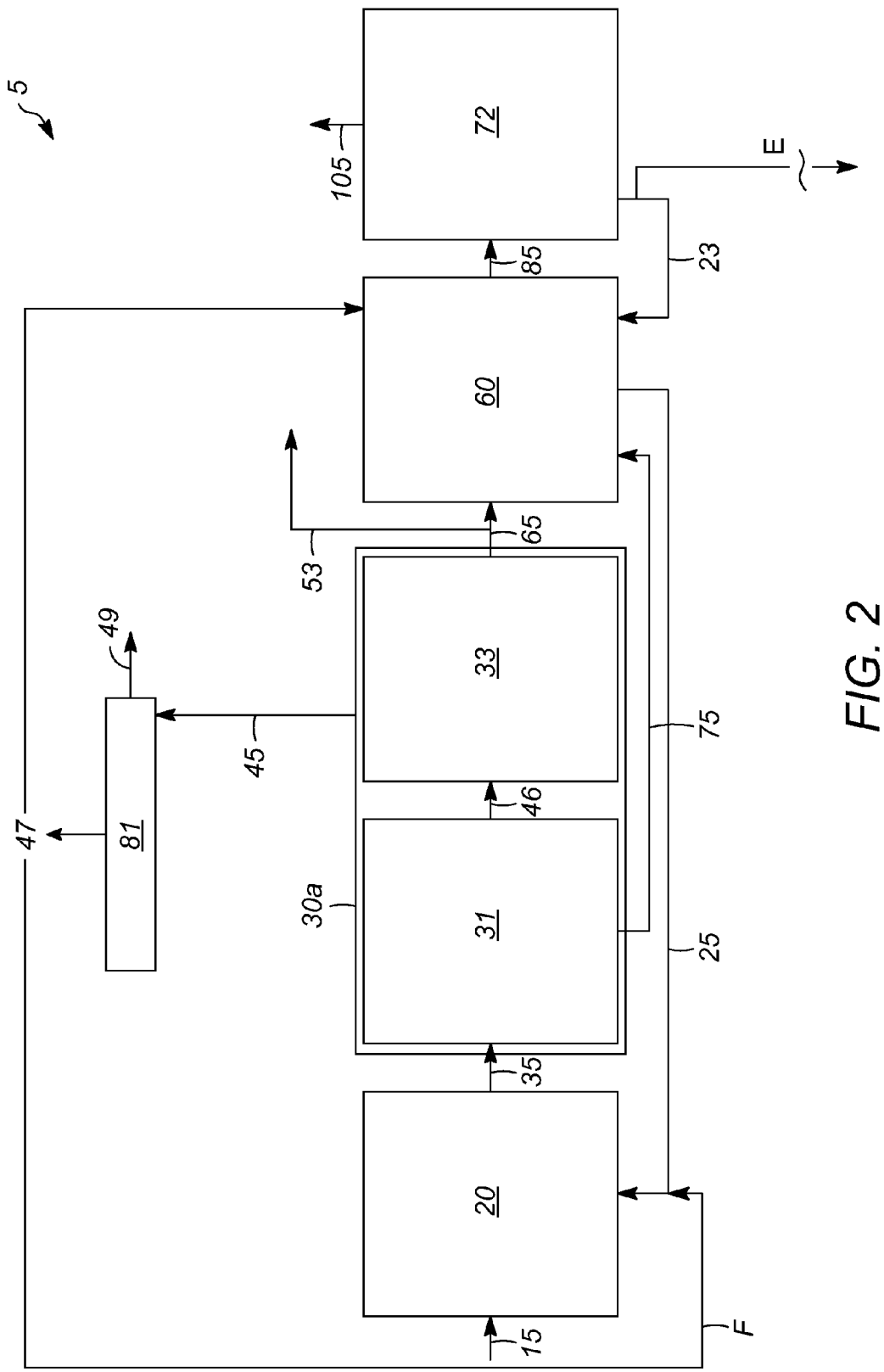
FIG. 2 is a diagram of an exemplary overall pyrolysis process apparatus including a dual stage cyclone separator of a gas-solid separator, in accordance with exemplary embodiments of the present invention.

FIG. 1 is a flow chart of a char-handling process 10, in accordance with an exemplary embodiment of the present invention. FIG. 2 illustrates a pyrolysis system 5 that uses the process 10 of FIG. 1. Referring to FIGS. 1 and 2, the process 10 begins by pyrolyzing carbonaceous biomass feedstock 15 (hereinafter "biomass") in a pyrolysis reactor 20 using a heat transfer medium and forming pyrolysis products and a spent heat transfer medium (step 12). The spent heat transfer medium leaving the pyrolysis reactor is entrained in gaseous pyrolysis products ("pyrolysis gases"), the pyrolysis gases with entrained spent heat transfer medium referred to in FIG. 2 with the reference numeral 35. As noted previously, the pyrolysis products comprise solid and gaseous pyrolysis products. Gaseous pyrolysis products 45 comprise a condensable portion and a non-condensable portion 47. The condensable portion may be condensed into liquid biomass-derived pyrolysis oil 49. The solid pyrolysis products include combustible solids containing carbon (also referred to herein as "char").

The heat transfer medium comprises inert solids, such as sand, catalytic solids, or both. The heat transfer medium leaving the pyrolysis reactor is said to be "spent", because it contains the combustible carbon-containing solids from the pyrolysis process. The gaseous pyrolysis products with entrained spent heat transfer medium 35 are transferred from the pyrolysis reactor 20 to a gas-solid separator 30a (FIG. 2) for separating the gaseous pyrolysis products 45 from the spent heat transfer medium and separating the spent heat transfer medium into separate streams of segregated char 65 and char-depleted spent heat transfer medium 75 (step 70). The term "char-depleted spent heat transfer medium" as used herein means both spent heat transfer medium from which all char has been removed and spent heat transfer medium from which a portion of the char has been removed but residual char remains.

Figure 3A:
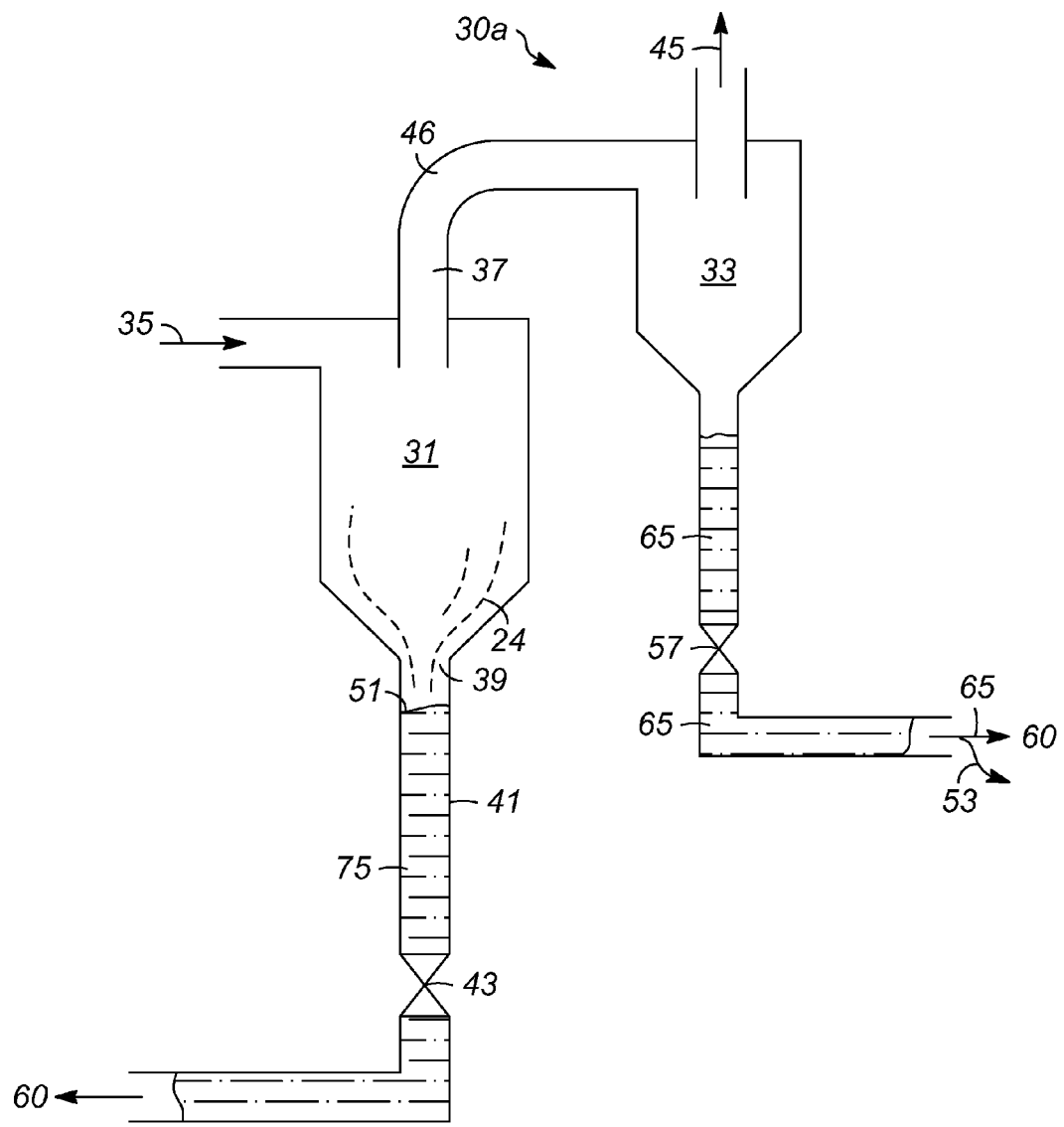
FIGS. 3A and 3B are schematic diagrams of different modes of operation in the dual stage cyclone separator of FIG. 2, in accordance with various exemplary embodiments of the present invention.
Figure 3B:
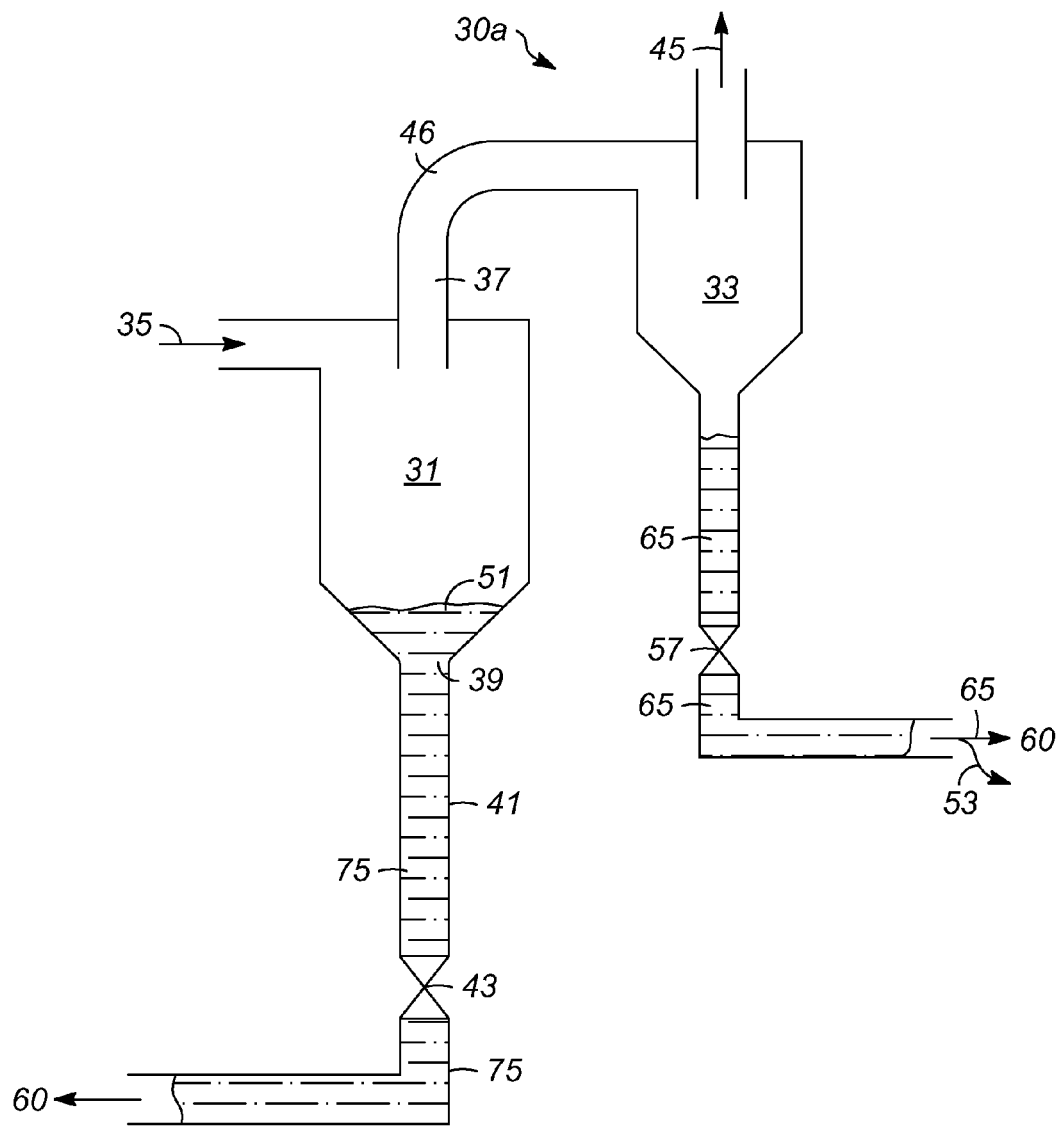

In one embodiment, as shown in FIGS. 2, 3A and 3B, the gas-solid separator 30a comprises a dual stage cyclone separator. The dual stage cyclone separator comprises a first stage cyclone separator 31 and a second stage cyclone separator 33. As shown in FIGS. 3A and 3B, the first stage cyclone separator 31 has a first outlet 37 coupled to an inlet of the second stage cyclone separator 33 and a second outlet 39 coupled to an inlet of the reheater 60. The char-depleted spent heat transfer medium 75 exits the first stage cyclone separator 31 and is directed to the reheater 60 via a pipe or dipleg 41. The level of solids in the pipe or dipleg 41 can be controlled by a first solids flow-control device 43 such as an L-valve, J-valve, slide valve or the like to control solids flow of the char-depleted spent heat transfer medium 75 (the inert solids, catalytic solids, or both) to the reheater 60 (FIGS. 3A and 3B).

In accordance with an exemplary embodiment, and as shown in FIGS. 2, 3A and 3B, the stream of gaseous pyrolysis products with entrained spent heat transfer medium 35 is transferred to the first stage cyclone separator of the gas-solid separator 30a. Preferably, the first stage cyclone separator collects the char-depleted spent heat transfer medium 75 and transfers a mixture 46 of pyrolysis gases with entrained char to the second stage cyclone separator 33. As shown in FIG. 3A, the first stage cyclone separator 31 generally runs substantially empty of solids with the gaseous pyrolysis gases being the continuous phase. The solids of the char-depleted spent heat transfer medium 75 do not become a continuous phase until exiting the first stage cyclone separator in the pipe or dipleg 41 because the cyclone gas vortex 24 in the first stage cyclone separator 31 would otherwise lift the solids of the char-depleted spent heat transfer medium out of the pipe or dipleg. A top surface 51 of the char-depleted spent heat transfer medium is shown in FIG. 3A in the dipleg 41 below the bottom of the first stage cyclone separator 31. A nitrogen purge (not shown) may be introduced at the top of the first stage cyclone separator to re-entrain the char from the first stage cyclone separator to the second stage cyclone separator, if necessary.

To improve char separation in a retrofitted dual stage cyclone separator, as shown in FIG. 3B, the first solids flow-control device 43 permits the solid particles of the char-depleted spent heat transfer medium 75 back into the bottom of the first stage cyclone separator (i.e., near or into the cyclone gas vortex 24 of the cyclone separator) so that the top surface 51 of the char-depleted spent heat transfer medium is at a higher level than that shown in 3A. By exposing the cyclone gas vortex to the char-depleted heat transfer medium, the cyclone gas vortex separates the lighter and/or smaller solid combustible particles (i.e., char) from the solid particles of the heat transfer medium in the first stage cyclone separator by lifting and carrying them out of the first stage cyclone separator 31 into the second stage cyclone separator 33 in the product vapor and fluidizing gas stream comprised of the pyrolysis gases with entrained char 46.

Still referring to FIGS. 2, 3A, and 3B, the second stage cyclone separator 33 collects pyrolysis gases with entrained char 46 from the first stage cyclone separator 31, resulting in separate streams of pyrolysis gases 45 and segregated char 65. The stream of pyrolysis gases 45 is transferred from the second stage cyclone separator 33 to a condenser 81 (FIG. 2). The condensable pyrolysis gases are condensed in the condenser into the liquid biomass-derived pyrolysis oil 49. The non-condensable pyrolysis gases 47 may be circulated to the reheater 60 for combustion and/or to the pyrolysis reactor 20 as lift medium for the heat transfer medium (as shown by arrow F in FIG. 2).

At least a portion of the segregated char 65 is transferred to the reheater 60 and processed as hereinafter described in accordance with FIGS. 6A-6E. In accordance with an exemplary embodiment, and as shown in FIGS. 2, 3A, and 3B, a portion of the segregated char may be exported (hereinafter "exported segregated char" 53) out of the pyrolysis system after exiting the gas-solid separator 30a and prior to the reheater 60 (step 300). Export of a portion of the segregated char prior to combustion helps maintain heat balance in the pyrolysis system and manage ash accumulation by removing a portion of the combustible solids before it would otherwise be combusted. The exported segregated char 53 may be further processed, used as end product (e.g., as fertilizer), sent for disposal, or a combination thereof. The exported segregated char may be removed before or after a second solids flow-control device 57 on the export stream (FIGS. 3A and 3B). Following is the calculation to determine the amount of exported segregated char 53 to be removed from the pyrolysis system in order to heat balance the pyrolysis system:

Char to be removed for heat balance (kg/hr)=$FY-\{GC_{p,FG}(T_{FG}-T_{air})+F(1-X_{H2O})H_{Rx}+F(C_{p,F}(T_{Rx}-T_F)+H_{vap})+Q_{losses}+AC_{p,A}(T_{sand}-T_{air})\}/H_{comb}$, wherein:
F=Wet biomass feed rate (kg/hr)
G=Flue gas rate (kg/hr)
$Q_{losses}$=Heat losses from pyrolysis system through walls to atmosphere (J/hr)
A=Air added for complete char combustion (kg/hr)
Y=Yield of char (kg char/kg wet biomass feed)

$X_{H2O}$=Mass fraction of water in wet biomass feed (kg water/kg wet biomass feed)
$C_{p,FG}$=Heat capacity of flue gas (J/kg/° C.)
$T_{FG}$=Temperature of flue gas leaving sand combustion bed (° C.)
$T_{air}$=Inlet temperature of air (° C.)
$T_F$=Inlet temperature of wet biomass feed (° C.)
$T_{sand}$=Temperature of sand bed in char combustion zone (° C.)
$T_{Rx}$=Temperature of pyrolysis reaction (° C.)
$C_{p,F}$=Sensible heat capacity of wet biomass feed (J/kg/° C.)
$C_{p,A}$=Heat capacity of air (J/kg/° C.)
$H_{Rx}$=Heat of reaction of pyrolytic conversion of biomass to pyrolysis products (J/kg dry biomass)
$H_{comb}$=Heat of combustion of char before or in sand combustion bed (J/kg char)
$H_{vap}$=Latent heat of vaporization of wet biomass (J/kg wet biomass)

Figure 4:
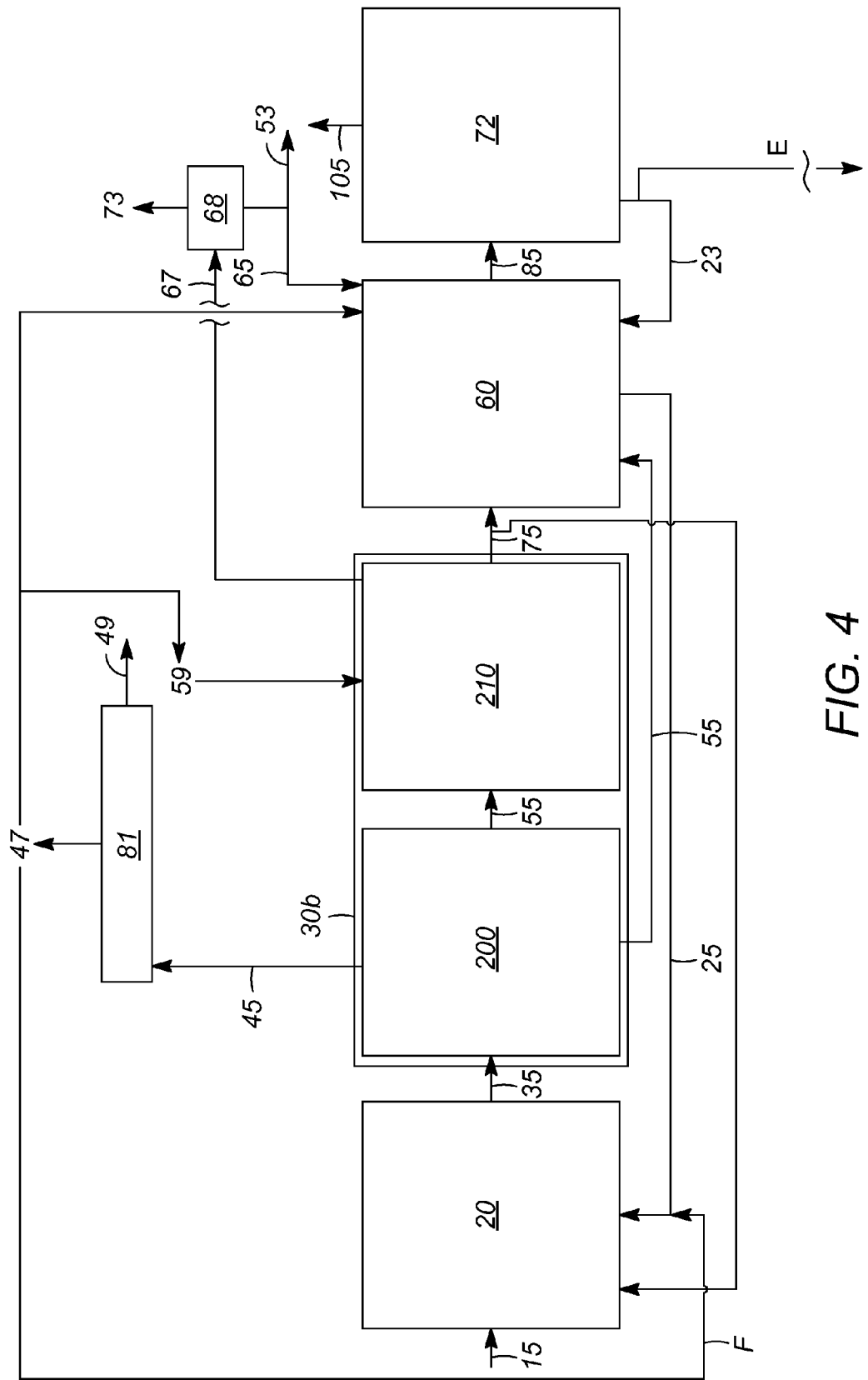
FIG. 4 is a diagram of another exemplary overall pyrolysis process apparatus including a cyclone separator coupled to an elutriation chamber in another gas-solid separator, in accordance with exemplary embodiments of the present invention.
Figure 5:
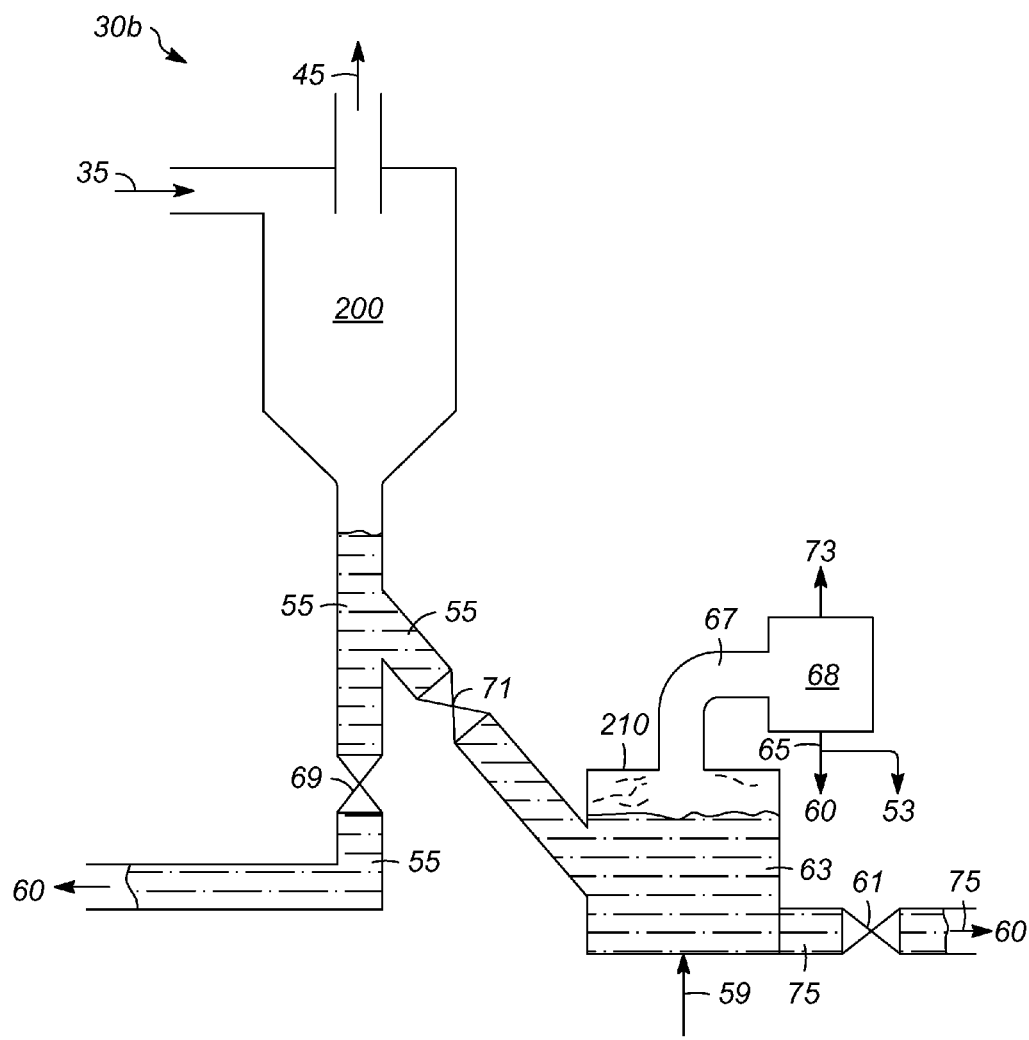
FIG. 5 is a schematic diagram of the mode of operation in the cyclone separator and elutriation chamber of FIG. 4, in accordance with another exemplary embodiment of the present invention.

In an alternative embodiment, as shown in FIGS. 4 and 5, the stream containing the gaseous pyrolysis products with entrained spent heat transfer medium 35 is transferred from the pyrolysis reactor 20 to a gas-solid separator 30b (FIG. 4). The gas-solid separator 30b comprises a cyclone separator 200 coupled to a char elutriation chamber 210. The gaseous pyrolysis products with entrained spent heat transfer medium 35 are transferred to the cyclone separator 200 for separation into separate streams of pyrolysis gases 45 and spent heat transfer medium 55. The pyrolysis gases 45 are transferred from the cyclone separator 200 of gas-solid separator 30b to the condenser 81 to condense the condensable gaseous pyrolysis products into liquid biomass-derived pyrolysis oil 49. The non-condensable gaseous pyrolysis gases 47 exit the condenser 81 and may be circulated to the reheater 60, as a source of fluidizing elutriation gas 59 for the char elutriation chamber 210, and/or to the pyrolysis reactor 20 as lift medium for the heat transfer medium (as shown by arrow F in FIG. 4). A first larger portion of the spent heat transfer medium 55 (with the gaseous pyrolysis products already removed) may be transferred to the reheater 60 and a second smaller portion thereof transferred to the char elutriation chamber 210. The flow to the reheater is controlled by a third solids flow control device 69 such as a slide valve (FIG. 5). The flow to the char elutriation chamber is controlled by a fourth solids flow control device 71. The second smaller portion of spent heat transfer medium 55 is introduced into a fluidized bed 63 of heat transfer medium maintained in the char elutriation chamber 210 for separation into a stream of char-depleted spent heat transfer medium 75 and a stream of segregated char and fluidizing elutriation gas (collectively referred to in FIGS. 4 and 5 with the reference numeral 67). The stream of char-depleted spent heat transfer medium 75 from the char elutriation chamber 210 is transferred to the reheater 60 through a fifth solids flow control device 61 or to the pyrolysis reactor 20.

The stream 67 of char and fluidizing elutriation gas is transferred to a solids-elutriation gas separator 68 such as a bag house, electrostatic precipitator, cyclone water deluge or the like for separation into segregated char 65 and fluidizing elutriation off-gas 73. As the combustible solid particles (i.e., the char) have a much lower density and/or smaller particle size than the solid particles of the heat transfer medium (i.e., inert solid particles, catalytic solid particles, or both), the char is readily elutriated by the fluidizing elutriation gas 59 from the non-condensable pyrolysis gases 47 or other convenient fluidizing gas. Elutriation is a known process for separating lighter particles from heavier particles using a vertically-directed stream of elutriation gas. The combustible particles rise to the top because their terminal velocities are lower than the velocity of the rising fluid.

At least a portion of the segregated char 65 is transferred to the reheater 60 and processed as hereinafter described in accordance with FIGS. 6A-6E. In accordance with an exemplary embodiment, and in the same manner as described above with respect to FIGS. 2, 3A, and 3B, and as shown in FIGS. 4 and 5, a portion of the segregated char may be exported out of the pyrolysis system after exiting the gas-solid separator 30b and prior to the reheater (FIG. 1, step 300). As noted previously, export of a portion of the segregated char prior to combustion helps maintain heat balance in the pyrolysis system and manage ash accumulation by removing a portion of the combustible solids before it would otherwise be combusted. The exported segregated char may be further processed, used as end product (e.g., as fertilizer), sent for disposal, or a combination thereof. The exported segregated char may be removed before or after a solids flow control device on the export stream. The amount of segregated char to be exported from the pyrolysis system in order to heat balance the pyrolysis system is calculated in the same manner as described above with respect to FIGS. 2, 3A and 3B. It is noted that, as the solids flow into the elutriation chamber of gas-solid separator 30b is relatively small compared to overall solids flow, the use of the gas-solid separator 30b is preferred when only a small fraction of the char is desired to be exported. While gas-solid separators 30a and 30b have been described, other types of gas-solid separators may be used to separate the pyrolysis gases from the spent heat transfer medium and at least a portion of the char from the spent heat transfer medium.

The char-depleted spent heat transfer medium 75 from gas-solid separator 30a and from gas-solid separator 30b are thereafter processed in the reheater 60 of FIGS. 2 and 4 as illustrated in FIGS. 6A-6E. The char-depleted spent heat transfer medium 75 from the first stage cyclone separator (of the gas-solid separator 30a in FIG. 2) and from the char elutriation chamber (of the gas-solid separator 30b in FIG. 4) is introduced into a fluidized dense bed 110 of the reheater 60 to combust at least a portion of any residual char using a stream of oxygen-containing regeneration gas 115, preferably air (step 80). An exemplary reheater 60 (shown in FIGS. 6A-6E) comprises a large vertical substantially cylindrical vessel 120 wherein the heat transfer medium is maintained as the fluidized dense bed 110 in the reheater by the upward passage of the oxygen-containing regeneration gas stream 115 (also referred to herein as a "primary oxidant stream"), preferably air, that fluidizes the heat transfer medium. The oxygen-containing regeneration gas stream also agitates the heat transfer medium within the fluidized dense bed. The oxygen-containing regeneration gas stream rises in an inlet riser 130 through the bottom of the reheater and into a reheater distributor 140a (FIG. 6A), 140b (FIGS. 6B and 6C), 140c (FIGS. 6D and 6E) into the reheater. The inlet riser 130 may include a first and a second inlet conduit 128 and 195 (FIGS. 6C and 6E) near a distal end thereof for purposes as hereinafter described. The fluidized dense bed 110 formed by the heat transfer medium is in a lower portion of the vessel and a dilute phase 150 is in an upper portion of the vessel. The reheater is typically maintained at a temperature of about 400° C. to about 1000° C.

Combustion product flue gas 85 (FIGS. 2 and 4) in the dilute phase, derived from the oxygen-containing regeneration gas stream, contains gases arising from the combustion of the combustible solids such as carbon dioxide, carbon monoxide from the oxygen-containing regeneration gas stream, inert gases such as nitrogen from air, and unreacted oxygen. The combustion product flue gas 85 also contains entrained combustible solids, inert solids, catalytic solids, or a combination thereof as well as at least a portion of the ash from combustion of the carbon from the combustible particles.

The portion of the ash that is not entrained in the combustion product flue gas remains in the fluidized dense bed of heat transfer medium. Depending on the ash yield and ash entrained in the combustion product flue gas, the amount of ash in the regenerated heat transfer medium may vary. In accordance with an exemplary embodiment, ash accumulation in the reheater is controlled by removing the "exported segregated char" from the pyrolysis system prior to combustion (to produce less ash) or combusting the segregated char in the fluidized dense bed of the reheater that results in more of the ash exiting the reheater in the combustion product flue gas, as hereinafter described.

The char-depleted spent heat transfer medium 75 from the gas-solid separator 30a or 30b is introduced into a lower portion of the fluidized dense bed to permit the residual char, if present, contained in the stream of char-depleted spent heat transfer medium to be combusted in the fluidized dense bed, as indicated by arrow A in FIGS. 6A-6E to designate the flow direction of the char-depleted spent heat transfer medium. Flow may be controlled by a first valve 175. As used herein, "a lower portion" of the fluidized dense bed means that portion closer to a bottom surface of the fluidized dense bed than a top surface of the fluidized dense bed. The char-depleted spent heat transfer medium enters the oxygen-containing regeneration gas stream in the reheater under conditions sufficient to combust the residual char converting the "char-depleted spent heat transfer medium" into "heat transfer medium". Heat from the combustion is transferred to the heat transfer medium in the fluidized dense bed. Combustion raises the temperature of the dense bed material (i.e., the heat transfer medium) to the operating conditions needed in the pyrolysis reactor, i.e., about 300° C. to about 900° C.

The segregated char 65 from gas-solid separator 30a and the segregated char 65 derived from gas-solid separator 30b are thereafter processed in the same manner. Still referring to FIGS. 1, 2, 4, and 6A-6E, at least a portion of the segregated char 65 from the second stage cyclone separator (gas-solid separator 30a (FIG. 2)) and from the solids-elutriation gas separator 68 (FIG. 4) is introduced into the fluidized dense bed of the reheater to combust at least a portion of the segregated char using the oxygen-containing regeneration gas and increase the temperature of the inert solids, the catalytic solids, or both, in the fluidized dense bed (step 90), as indicated by arrow B in FIGS. 6A-6E to designate the flow direction of the segregated char. Flow of the segregated char into the fluidized dense bed may be controlled by a second valve 180. Segregation of the char stream from the char-depleted spent heat transfer medium permits its deeper introduction into the fluidized dense bed thus minimizing the potential for afterburn in the dilute phase.

Figure 6A:
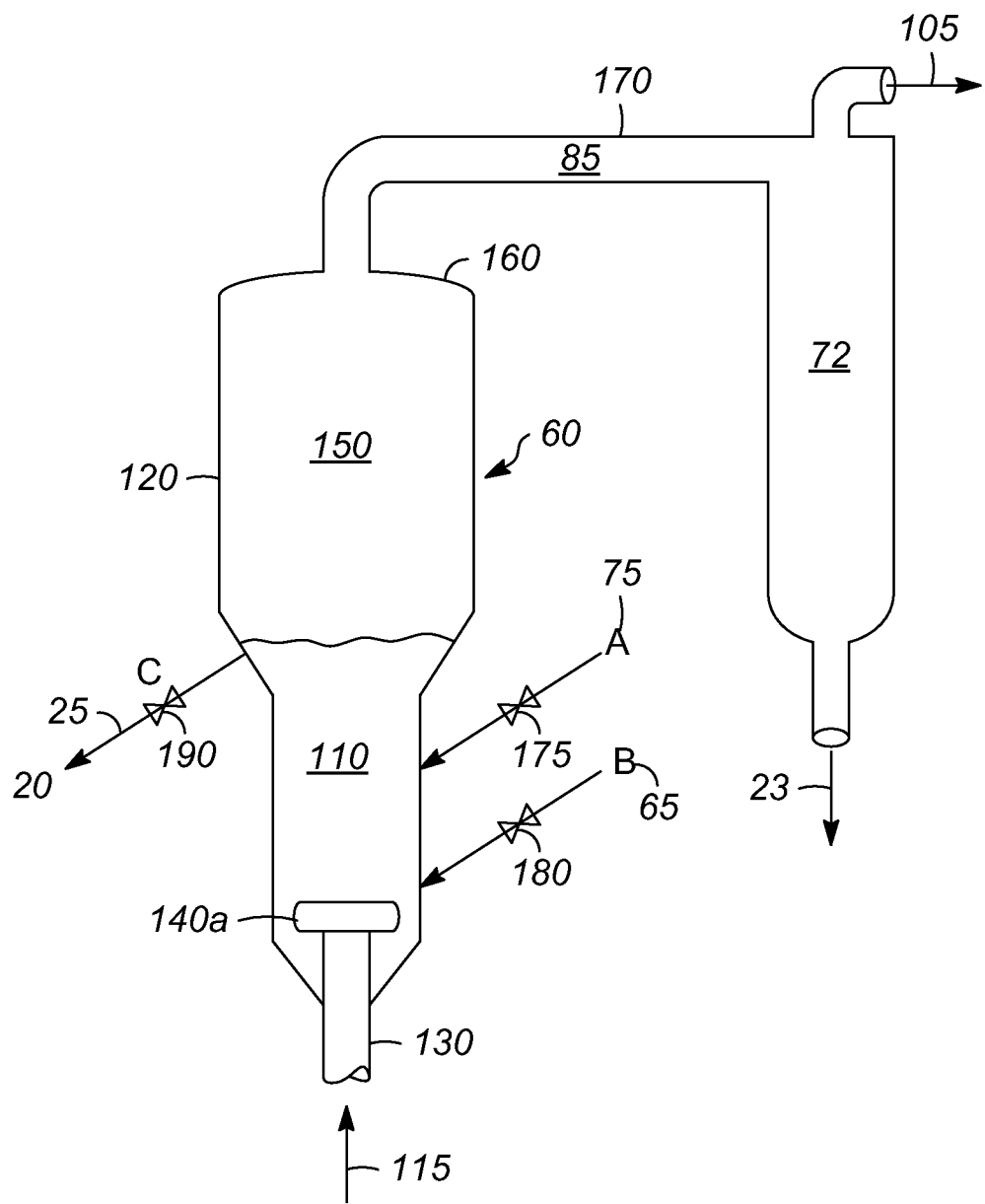
FIGS. 6A-6E are schematic diagrams of various exemplary embodiments of the reheater of the present invention.

In one embodiment, as shown in FIG. 6A, the segregated char may be introduced directly into the fluidized dense bed to mix with the inert solids, catalytic solids, or both in the fluidized dense bed, where the segregated char 65 is then combusted by the oxygen-containing regeneration gas stream 115, which increases the temperature of the heat transfer medium to pyrolysis temperature, as noted previously. The segregated char is introduced at an elevation below where the char-depleted spent heat transfer medium is introduced, permitting more efficient combustion and additional combustion time. The oxygen-containing regeneration gas stream 115 rises in the inlet riser 130 through the bottom of the reheater and into the reheater distributor 140*a* in the bottom portion of the reheater. The reheater distributor includes an opening (not shown in FIG. 6A) through which the oxygen-containing regeneration gas stream 115 is discharged into the reheater.

Figure 6B:
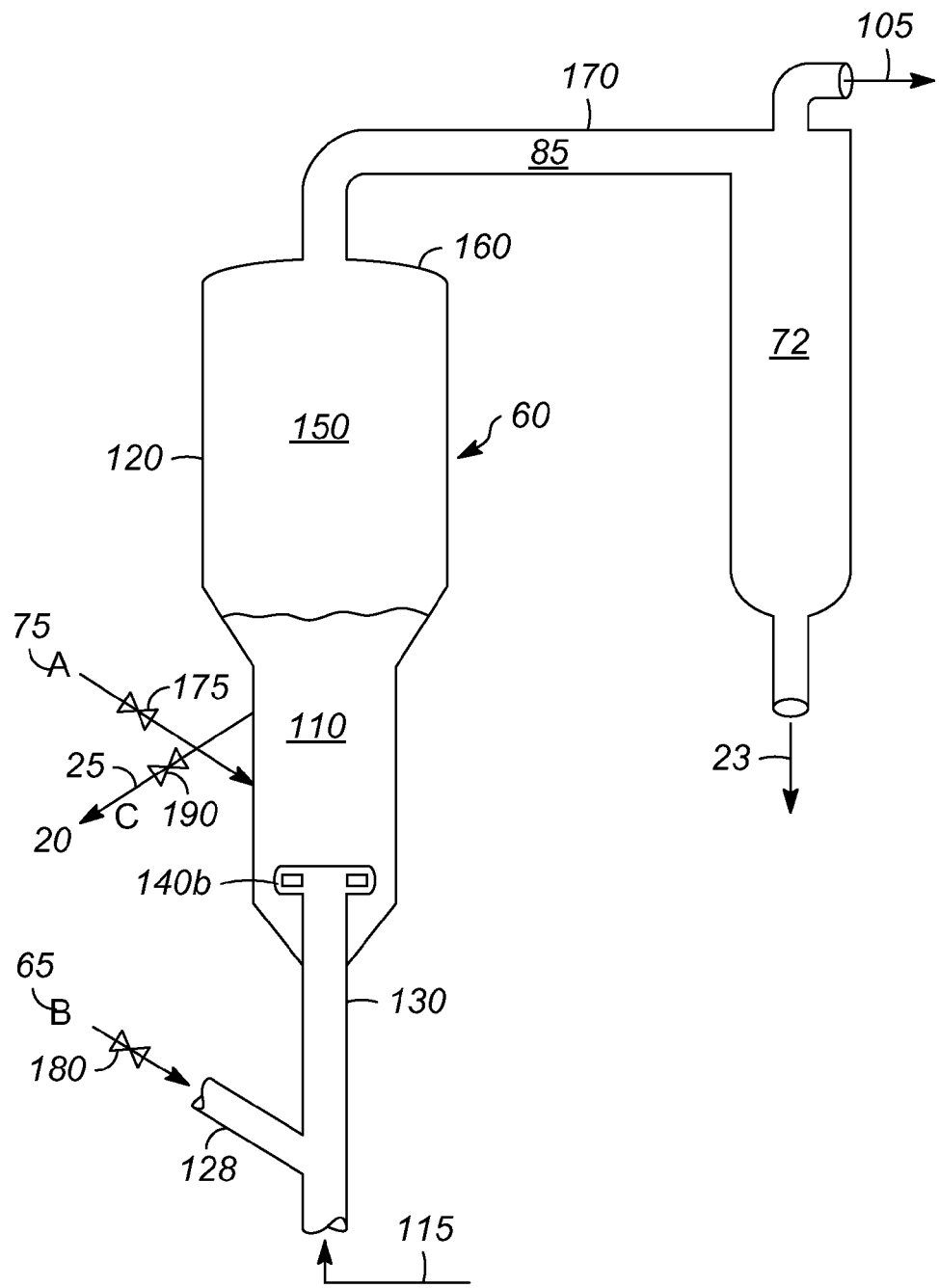
Figure 6C:
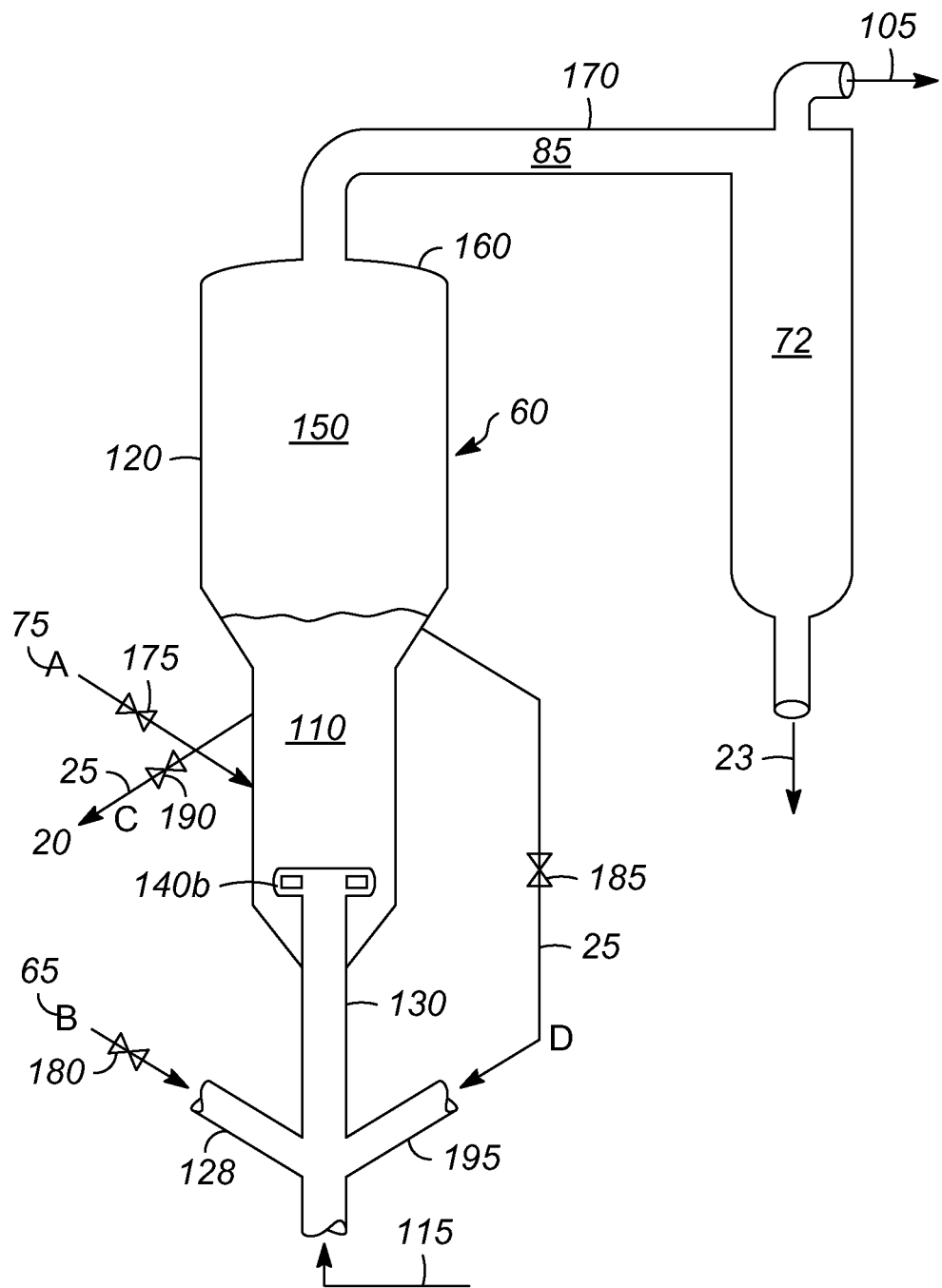
Figure 6D:
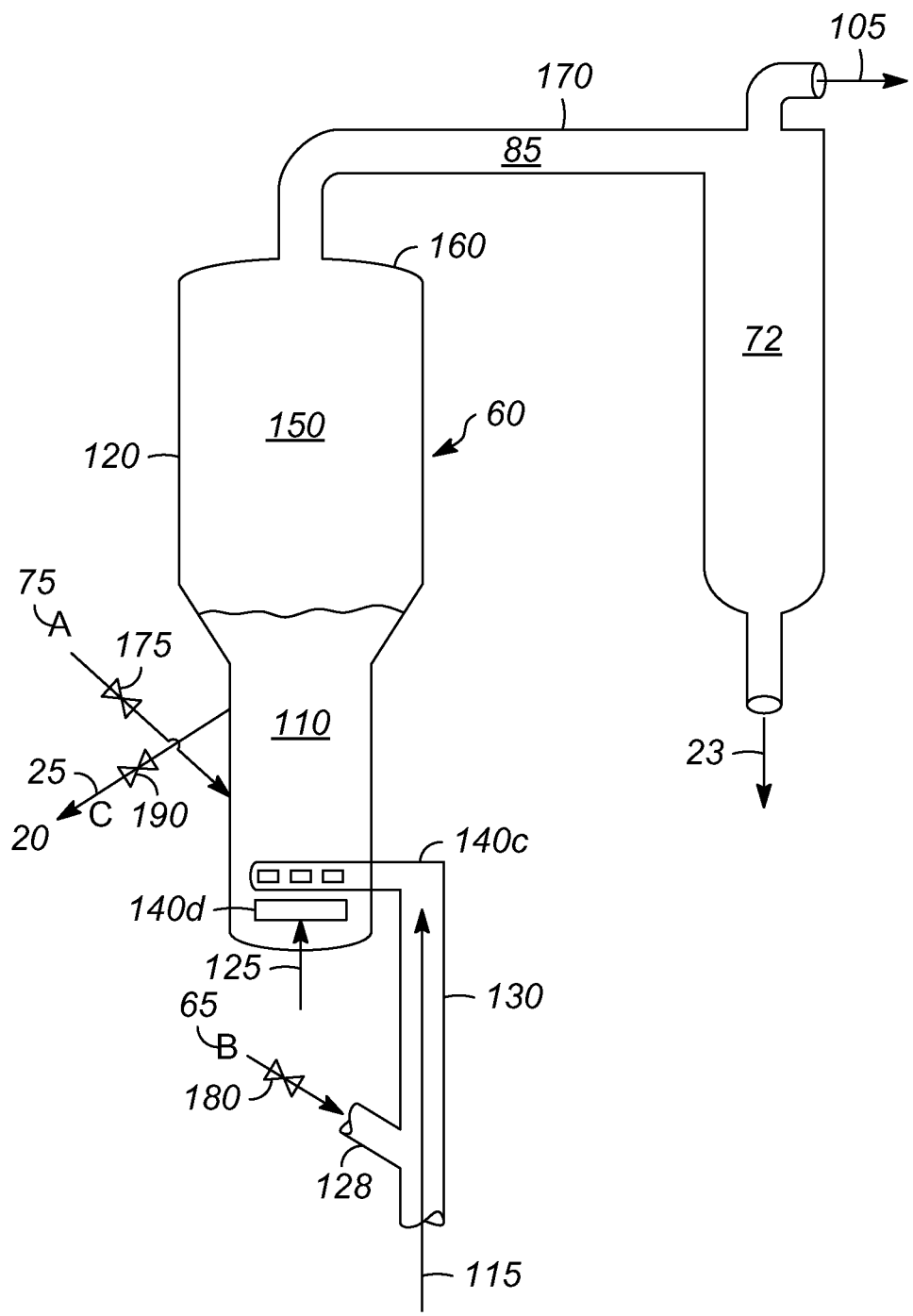
Figure 6E:
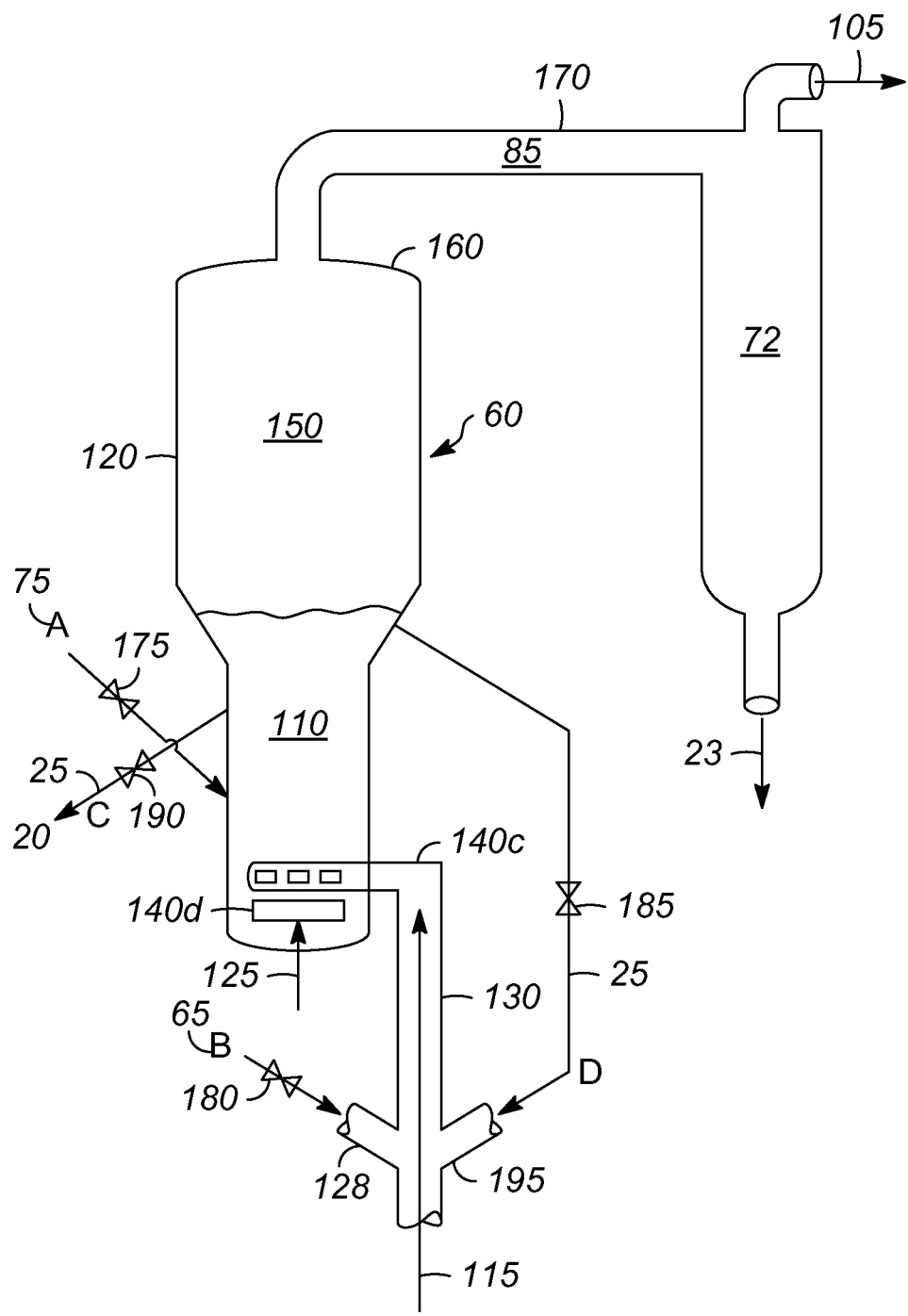

In alternative embodiments as shown in FIGS. 6B-6E, the segregated char 65 may be combusted in the dense bed and additionally combusted (step 100) (FIG. 1) outside of the reheater in the inlet riser 130 through which the stream of oxygen-containing regeneration gas 115 is introduced upwardly into the dense bed. In the additional combustion step, the segregated char 65 is introduced into the oxygen-containing regeneration gas stream through the first inlet conduit 128 near a distal end of the inlet riser 130 and into the reheater 60 through a reheater distributor 140*b* or 140*c*, as hereinafter described. The segregated char is initially combusted in the inlet riser and then the non-combusted segregated char is combusted in the dense bed. As shown in FIGS. 6C and 6E, the segregated char 65 may be mixed with an effective amount (equal to the flow rate of A or C of the heated inert solids, catalytic solids, or both (i.e., the heat transfer medium), as indicated by arrow D from the reheater dense bed which increases the rate of additional combustion of the segregated char. The heated inert solids, heated catalytic solids, or both may be introduced into the inlet riser through the second inlet conduit 195 to mix with the segregated char (FIGS. 6C and 6E). The flow of the heated inert solids, heated catalytic solids, or both from the reheater may be controlled by a third valve 185. The segregated char is at least partially combusted outside of the reheater while it flows upwardly in the inlet riser, with or without the heated heat transfer medium, in the oxygen-containing regeneration gas, and further combusted in the fluidized dense bed, thereby minimizing its combustion, i.e., "afterburn" in the dilute phase or downstream therefrom, such as in a plenum 160 or a flue gas transfer line 170. The reheater distributor 140*b* (FIGS. 6B and 6C) may include at least one opening through which the oxygen-containing regeneration gas and the segregated char, or the oxygen-containing regeneration gas and the mixture of segregated char and heated heat transfer medium may be discharged into the lower portion of the dense bed. The oxygen provided by the oxygen-containing regeneration gas stream 115 comprises substantially the stoichiometric amount of oxygen needed for substantially complete combustion of the char (both residual and segregated char) (FIGS. 6A, 6B, and 6C). Alternatively, more than the stoichiometric amount of oxygen may be added, in an amount of about 10 to about 15% more than the stoichiometric amount.

In other embodiments, as shown for example in FIGS. 6D and 6E, less than the stoichiometric amount of oxygen is provided by the oxygen-containing regeneration gas stream (hereinafter referred to as a "primary oxidant stream") and a secondary oxidant stream 125 also enters the reheater. The secondary oxidant stream preferably comprises air. The secondary oxidant stream provides from about 25 to about 75% of the overall oxygen gas needed for substantially complete combustion of the char (both residual and segregated char) in the reheater. The primary oxidant stream is introduced into the reheater through reheater distributor 140*c*. In one exemplary embodiment, the reheater distributor 140*c* comprises a substantially L-shaped distributor and includes openings through which the primary oxidant stream is introduced into the reheater along with at least partially combusted segregated char or a mixture of at least partially combusted char and heated heat transfer medium. The secondary oxidant stream enters the reheater through a reheater distributor 140*d* at a level below the reheater distributor 140*c*.

Combustion of the combustible solids from the spent heat transfer medium regenerates the heat transfer medium. The regenerated heat transfer medium 25 is withdrawn from an upper portion of the fluidized dense bed and returned to the pyrolysis reactor 20, as indicated by arrow C in FIGS. 6A-6E, for further usage as the heat transfer medium, as shown in FIGS. 2 and 4. Flow of the regenerated heat transfer medium 25 from the reheater may be controlled by a fourth valve 190.

Referring again to FIGS. 2 and 4 and 6A-6E, the combustion product flue gas 85 passes from the reheater 60 via gas discharge conduit (not shown) into the plenum 160, located in the upper portion of the reheater. Combustion product flue gas 85 is vented or otherwise removed from the reheater via the flue gas transfer line 170 from the plenum into an external flue gas-solids separator 72 such as a cyclone separator. At least a portion of the solid particles entrained in the combustion product flue gas 85, such as a mixture 23 of heat transfer medium and ash, are separated from the combustion product flue gas 85 in the external flue gas-solid separator 72 forming substantially solids-free flue gas 105. The substantially solids-free flue gas may contain residual combustible solid particles and residual ash particles as these particles are generally smaller (on average) than the inert solid particles and the catalytic solid particles and therefore not as easily separated from the flue gas in the external flue gas-solids separator 72. That the substantially solids-free flue gas may contain residual ash particles enables the ash particles to escape the reheater confines, thus substantially preventing ash build-up in the reheater.

As shown in FIGS. 2 and 4, the mixture 23 of separated heat transfer medium and ash from the flue gas-solid separator may be recirculated to the reheater for regeneration of the separated heat transfer medium. Alternatively, the mixture 23 of separated heat transfer medium and ash may be removed from the pyrolysis system as indicated by arrow E in FIGS. 2 and 4. As a matter of economics, a heat transfer medium comprising catalytic solids may be recirculated to the reheater while typically less costly sand is removed from the pyrolysis system for disposal. Ash may be also separated from the mixture 23 by known methods and removed from the pyrolysis system (not shown).

From the foregoing, it is to be appreciated that the exemplary embodiments of the char-handling processes for char segregation and selective removal from the pyrolysis system have been provided. Such char-handling processes help control the overall heat balance, ash accumulation, and afterburn in the reheater during regeneration of the heat transfer medium. The char-handling processes contribute to combustion of the combustible solids and the carbon monoxide below the dilute phase such as in the fluidized dense bed or in an inlet riser into the reheater, thus minimizing combustion in the dilute phase, or downstream therefrom (i.e., "afterburning") which also results in more ash leaving with the combustion product flue gas. Therefore, the amount of heat transferred to the reheater dense bed is increased for regeneration of the heat transfer medium and ash accumulation is minimized. In addition, such char-handling processes permit the selective removal of a portion of the energy rich char stream from the pyrolysis system to provide a balance between the heat supplied from char combustion in the reheater with the heat demand due to sensible and latent heat required from the cold feedstock, ambient heat losses, and the pyrolysis reaction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for pyrolysis of a carbonaceous biomass feedstock in a pyrolysis system, comprising:
   i) pyrolyzing carbonaceous biomass feedstock using a heat transfer medium forming pyrolysis products and a spent heat transfer medium;
   ii) separating the spent heat transfer medium into segregated char and char-depleted spent heat transfer medium;
   iii) introducing the char-depleted spent heat transfer medium into a dense bed of heat transfer medium fluidized by a stream of oxygen-containing regeneration gas;
   iv) combusting all or a portion of the segregated char in the dense bed using the stream of oxygen-containing regeneration gas; and
   v) additionally combusting the segregated char outside of a reheater of the pyrolysis system in the stream of oxygen-containing regeneration gas before introduction of the segregated char into the dense bed.

2. The process of claim 1, wherein the step of additionally combusting the segregated char comprises mixing in an inlet riser the heat transfer medium from the dense bed with the segregated char in the stream of oxygen-containing regeneration gas.

3. The process of claim 1, wherein the step of introducing the char-depleted spent heat transfer medium comprises combusting residual char in the char-depleted spent heat transfer medium.

4. The process of claim 1, wherein the step of introducing the char-depleted spent heat transfer medium comprises introducing the char-depleted spent heat transfer medium into a lower portion of the dense bed.

5. The process of claim 1, wherein the steps of combusting and additionally combusting the segregated char comprise introducing the segregated char into the dense bed below the elevation where the char-depleted spent heat transfer medium is introduced.

6. The process of claim 1, wherein the steps of combusting and additionally combusting the segregated char comprise providing substantially at least a stoichiometric amount of oxygen in the oxygen-containing regeneration gas to combust the segregated char and the residual char.

7. The process of claim 1, wherein the steps of combusting and additionally combusting the segregated char comprise providing less than the stoichiometric amount of oxygen in the oxygen-containing regeneration gas and using a secondary oxygen-containing regeneration gas to combust the segregated char.

8. The process of claim 1, wherein the step of separating the spent heat transfer medium comprises separating using a dual stage cyclone separator, a cyclone separator coupled to an elutriation chamber, or both.

9. The process of claim 8, wherein the step of separating the spent heat transfer medium using the dual stage cyclone separator comprises exposing the char-depleted spent heat transfer medium to a cyclone gas vortex in a first stage cyclone separator that lifts and carries residual char in the char-depleted spent heat transfer medium from the first stage cyclone separator into a second stage cyclone separator.

10. The process of claim 1, further comprising the step of exporting a portion of the segregated char from the pyrolysis system prior to the combusting step.

11. A process for controlling heat balance, afterburn, and ash accumulation in a reheater, comprising:
   i) separating spent heat transfer medium from a pyrolysis reactor into char-depleted spent heat transfer medium and segregated char;
   ii) introducing the char-depleted spent heat transfer medium into a fluidized dense bed of heat transfer medium, the fluidized dense bed maintained by a stream of oxygen-containing regeneration gas and having a dilute phase above the fluidized dense bed;
   iii) introducing at least a portion of the segregated char into the fluidized dense bed of a reheater of the pyrolysis system below the elevation where the char-depleted spent heat transfer medium is introduced, into the stream of oxygen-containing regeneration gas outside of the reheater at a distal end of an inlet riser into the reheater, or both, to combust the segregated char below the dilute phase.

12. The process of claim 11, wherein the step of separating the spent heat transfer medium comprises separating using a dual stage cyclone separator, a cyclone separator coupled to an elutriation chamber, or both.

13. The process of claim 11, further comprising the step of exporting a portion of the segregated char prior to the step of introducing at least a portion of the segregated char into the fluidized dense bed step.

14. The process of claim 11, wherein the step of introducing the char-depleted spent heat transfer medium comprises combusting residual char in the char-depleted spent heat transfer medium.

15. The process of claim 11, wherein the step of introducing the segregated char into the stream of oxygen-containing regeneration gas outside of the reheater comprises mixing the segregated char with the heat transfer medium from the reheater outside of the reheater in the stream of oxygen-containing regeneration gas.

16. The process of claim 11, wherein the step of introducing the segregated char into the stream of oxygen-containing regeneration gas outside of the reheater comprises introducing the heat transfer medium into the oxygen-containing regeneration gas at the distal end of the inlet riser to mix with the segregated char.

17. The process of claim 12, wherein the step of introducing the segregated char comprises providing at least a stoichiometric amount of oxygen in the oxygen-containing regeneration gas to combust the segregated char and the residual char.

18. The process of claim 12, wherein the step of introducing the segregated char comprises providing less than the stoichiometric amount of oxygen in the oxygen-containing regeneration gas and using a secondary oxygen-containing regeneration gas to combust the segregated char and the residual char.

19. A process for controlling afterburn in a reheater, the reheater including a fluidized dense bed of heat transfer medium and a dilute phase, the dilute phase disposed above the fluidized dense bed, the process comprising the steps of:
   substantially separating char from spent heat transfer medium to form segregated char and char-depleted heat transfer medium, the char-depleted spent heat transfer medium comprising a mixture of residual char and inert solids, catalytic solids, or both;

introducing the char-depleted spent heat transfer medium into the reheater;

combusting the residual char and converting the char-depleted spent heat transfer medium into a heat transfer medium in the fluidized dense bed using an oxygen-containing regeneration gas introduced into the reheater through an inlet riser; and combusting the segregated char with an effective amount of the heat transfer medium from the fluidized dense bed in the oxygen-containing regeneration gas outside the reheater.

20. The process of claim 19, wherein the step of combusting the segregated char comprises providing substantially a stoichiometric amount of oxygen in the oxygen-containing regeneration gas to combust the segregated char and the residual char.

21. The process of claim 19, wherein the step of combusting the segregated char comprises providing less than the stoichiometric amount of oxygen in the oxygen-containing regeneration gas and using a secondary oxygen-containing regeneration gas to combust the segregated char and the residual char.

\* \* \* \* \*